United States Patent
Suh et al.

(10) Patent No.: US 7,606,269 B1
(45) Date of Patent: Oct. 20, 2009

(54) METHOD AND APPARATUS FOR DETECTING AND MANAGING LOSS OF ALIGNMENT IN A VIRTUALLY CONCATENATED GROUP

(75) Inventors: Soowan Suh, San Ramon, CA (US); Jing Ling, Fremont, CA (US); Juan-Carlos Calderon, Fremont, CA (US); Rodrigo Gonzalez, Concord, CA (US)

(73) Assignee: Intel Corporation, Santa Clara, CA (US)

( * ) Notice: Subject to any disclaimer, the term of this patent is extended or adjusted under 35 U.S.C. 154(b) by 897 days.

(21) Appl. No.: 10/900,813

(22) Filed: Jul. 27, 2004

(51) Int. Cl.
 *H04J 3/06* (2006.01)
 *H04L 12/28* (2006.01)
 *H04L 12/56* (2006.01)

(52) U.S. Cl. .................... 370/503; 370/392; 370/907

(58) Field of Classification Search ............... 370/389, 370/392, 503, 512, 516, 537, 907
See application file for complete search history.

(56) References Cited

U.S. PATENT DOCUMENTS

| | | | | |
|---|---|---|---|---|
| 4,996,698 A * | 2/1991 | Nelson | .................... | 375/372 |
| 5,113,395 A * | 5/1992 | Murakami et al. | .......... | 370/505 |
| 5,119,406 A * | 6/1992 | Kramer | ..................... | 375/372 |
| 5,172,376 A * | 12/1992 | Chopping et al. | .......... | 370/509 |
| 5,390,180 A * | 2/1995 | Reilly | ........................ | 370/476 |
| 5,519,701 A * | 5/1996 | Colmant et al. | ............. | 370/412 |
| 5,537,447 A * | 7/1996 | Urbansky | .................. | 375/372 |
| 5,717,693 A * | 2/1998 | Baydar et al. | ............... | 370/514 |
| 6,088,413 A * | 7/2000 | Autry et al. | ................. | 375/372 |
| 6,442,163 B1 * | 8/2002 | Chopping | ................. | 370/395.1 |
| 6,473,818 B1 * | 10/2002 | Niu et al. | ..................... | 711/168 |
| 6,842,787 B2 * | 1/2005 | Stadler et al. | ............... | 709/231 |
| 7,068,685 B1 * | 6/2006 | Sihvola | ...................... | 370/506 |
| 7,145,701 B2 * | 12/2006 | Haas et al. | .................. | 358/497 |
| 7,145,920 B2 * | 12/2006 | Kinoshita et al. | .......... | 370/503 |
| 7,415,048 B2 * | 8/2008 | Wu | ............................ | 370/542 |
| 7,463,626 B2 * | 12/2008 | Roy et al. | ................... | 370/388 |
| 7,499,407 B2 * | 3/2009 | Holness et al. | .............. | 370/242 |
| 2002/0150049 A1 * | 10/2002 | Collier et al. | ............... | 370/236 |
| 2002/0154659 A1 * | 10/2002 | Singh et al. | ................. | 370/535 |
| 2004/0264496 A1 * | 12/2004 | Shaffer et al. | ............... | 370/464 |
| 2005/0002403 A1 * | 1/2005 | Roberts et al. | ......... | 370/395.51 |
| 2005/0068991 A1 * | 3/2005 | Jarabek et al. | .............. | 370/516 |
| 2005/0141418 A1 * | 6/2005 | Moon et al. | ................. | 370/229 |
| 2006/0013133 A1 * | 1/2006 | Peng et al. | .................. | 370/230 |

OTHER PUBLICATIONS

"Current Issues in Packet Switch Design", Minkenberg et al. ACM SIGCOMM Computer Communications Review, vol. 33, No. 1: Jan. 2003, pp. 119-124.*

"TFI-5: TDM Fabric to Framer Interface Implementation Agreement", OIF-TFI-5-01.0, Sep. 16, 2003, Optical Internetworking Forum, pp. 1-71.*

* cited by examiner

*Primary Examiner*—Chi H Pham
*Assistant Examiner*—Warner Wong
(74) *Attorney, Agent, or Firm*—Blakely, Sokoloff, Taylor & Zafman LLP

(57) ABSTRACT

A method and apparatus for determining a loss of alignment defect in a communications network employing virtually concatenated payloads is provided. The method and apparatus comprise performing specific evaluations and assessments of conditions under normal conditions as well as evaluations and assessments under LCAS conditions where additional members may be added using the LCAS ADD state.

26 Claims, 6 Drawing Sheets

METHOD AND APPARATUS FOR DETECTING AND MANAGING LOSS OF ALIGNMENT IN A VIRTUALLY CONCATENATED GROUP

BACKGROUND OF THE INVENTION

1. Field of the Invention

The present invention relates generally to the field of high speed data transfer, and more specifically to managing virtually concatenated payload groups in specific data transfer architectures, such as SONET/SDH.

2. Description of the Related Art

Data communication networks receive and transmit ever increasing amounts of data. Data is transmitted from an originator or requester through a network to a destination, such as a router, switching platform, other network, or application. Along this path may be multiple transfer points, such as hardware routers, that receive data typically in the form of packets or data frames. At each transfer point data must be routed to the next point in the network in a rapid and efficient manner.

Data transmission over fiber optics networks may conform to the SONET and/or SDH standards. SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU). As used herein, the SONET/SDH concepts are more fully detailed in various ANSI and ITU standards, including but not limited to the discussion of concatenated payloads, ITU-T G.707 2000, T1.105-2001 (draft), and T1.105.02-1995.

SONET/SDH may employ virtually concatenated payloads. The virtual concatenation payload support for a SONET/SDH network requires compensation for differential delay among members of the same group. Differential delay results from the payload, which is divided into groups, taking different paths through the network, or due to pointer processing, or other considerations. Data generated at the same time from the source node (with the same MFI, multi-frame indication) in the same group may arrive at the destination node at different times. Further, if the network provides LCAS (Link Capacity Adjustment Scheme) support, new payload members may be added or existing members may be removed, again varying the set of arrival times. Data from different members are typically stored in memory upon arrival at the destination node. Differential delay compensation essentially enables processing all virtual concatenation payload groups at the destination node at one time. In other words, the destination node reads all data from members having the same MFI at one time.

The SONET/SDH virtual concatenation standard provides a maximum differential delay equal to 2048 frames or 256 ms. Differential delay beyond this value cannot be processed. Actual compensable differential delay depends on the memory size used to store the data, called the Alignment Buffer. Alignment Buffer specifications are provided in ITU-T G.783, and state that the LOA (Loss of Alignment) defect "shall be detected if the alignment process cannot perform the alignment of the individual VC-4s to a common multiframe start (e.g. dLOA [LOA defect] is activated if the differential delay exceeds the size of the alignment buffer.)" LOA defect generation is not specified, and may take various forms depending on circumstances.

A design for loss of alignment defect (dLOA) signal generation, applicable when the alignment process in a virtually concatenated environment employing differential delay compensation when the differential delay exceeds the size of the alignment buffer, may provide enhanced processing capabilities and other advantageous qualities over previously known designs, including designs employing the SONET/SDH architecture.

DESCRIPTION OF THE DRAWINGS

The present invention is illustrated by way of example, and not by way of limitation, in the figures of the accompanying drawings in which.

DETAILED DESCRIPTION OF THE INVENTION

The present design determines whether an LOA defect has occurred and detects whether a potential LOA has occurred before adding a new member to a virtual concatenation group, such as by using the LCAS algorithm, such that loss of alignment would not occur after adding the member.

SONET/SDH defines optical carrier levels and electrically equivalent synchronous transport signals (STSs) for the fiber-optic based hierarchy. In SONET, any type of service, ranging from voice to high speed data and video, can be accepted by various types of service adapters. A service adapter maps the signal into the payload envelope of the STS-1. All inputs received are eventually converted to a base format of a synchronous STS-1 signal at 51.84 Mbps or higher. Several synchronous STS-1s may then be multiplexed together in either a single or two stage process to form an electrical STS-n signal, where n is one or more.

SONET uses a basic transmission rate of STS-1, equivalent to 51.84 Mbps. Higher level signals are integer multiples of the base rate. For example, STS-3 is three times the rate of STS-1, i.e. three times 51.84 or 155.52 Mbps, while an STS-12 rate would be twelve times 51.84 or 622.08 Mbps. The SONET architecture employs frames, where the frame is generally divided into two main areas: transport overhead and the synchronous payload envelope, or SPE. The SPE comprises two components, namely STS path overhead and payload. The payload is the traffic being transported and routed over the SONET network. Once the payload is multiplexed into the SPE, the payload can be transported and switched through SONET without having the need to be examined and possibly demultiplexed at intermediate nodes.

The SONET/SDH architecture supports Virtually Concatenated Payloads. Virtual concatenation enables dividing payloads to improve partitioning of SONET/SDH bandwidth and more efficiently carry traffic. Virtual concatenation employs the base SONET/SDH payloads and groups these payloads together to create a larger, size appropriate aggregate payload based on the STS and SPE employed. Virtual concatenation thus enables variation of the payload capacity and allows payload sizes matching client service data rate. This sizing enhancement allows a larger number of channels to be mapped into the SONET/SDH signal.

Figure 1A:
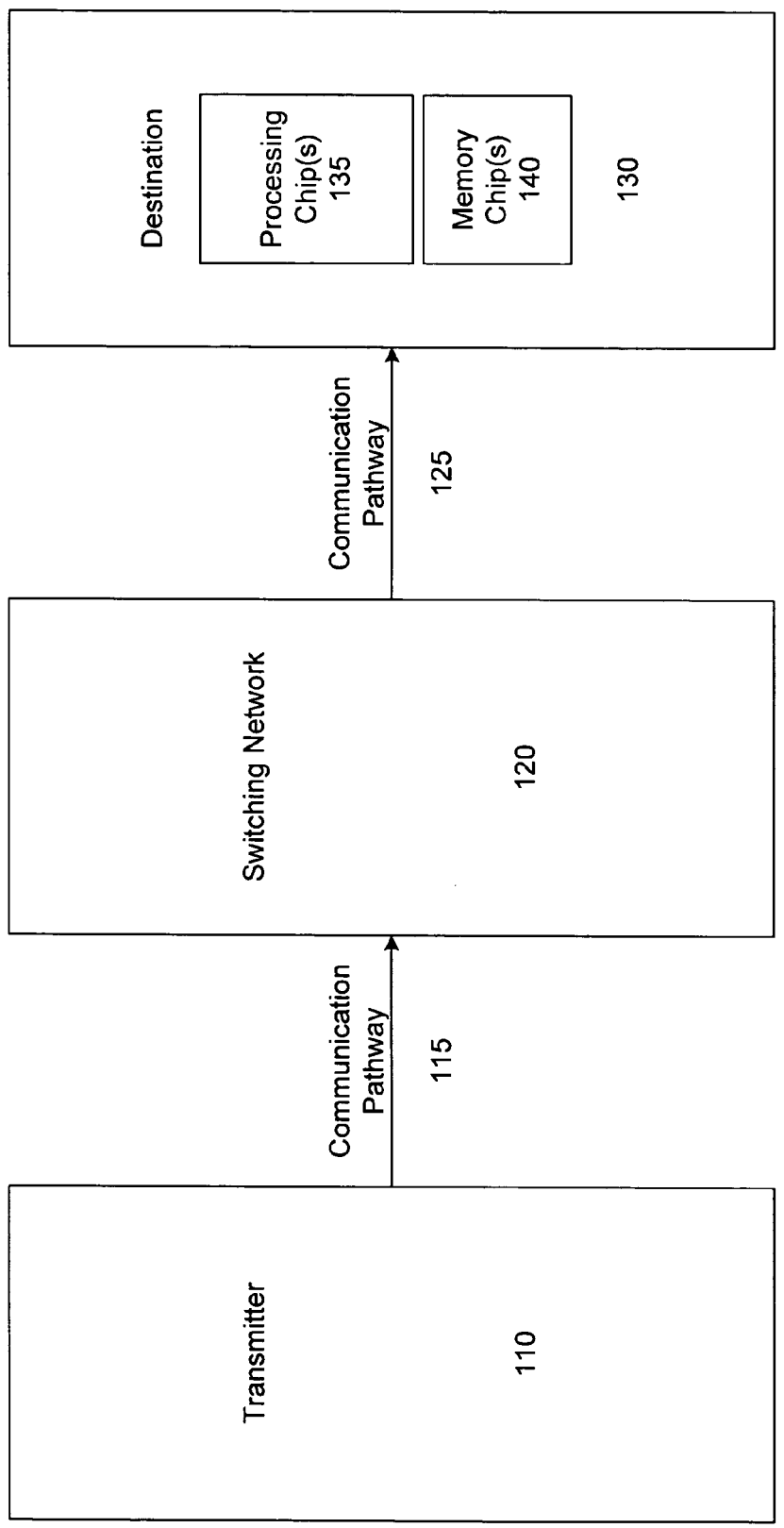
FIG. 1A is a conceptual illustration of a SONET/SDH communications switching system employing the design provided herein.

A typical SONET/SDH switching system 100 is shown in FIG. 1A. In the SONET/SDH switching system 100, a transmitter 110 is connected through a communication pathway 115 to a switching network 120. Switching network 120 is connected through a communication pathway 125 to a destination 130. The transmitter 110 sends data as a series of payloads/frames to the destination 130 through the switching network 120. In the switching network 120, packets typically pass through a series of hardware and/or software components, such as servers. As each payload arrives at a hardware and/or software component, the component may store the payload briefly before transmitting the payload to the next component. The payloads proceed individually through the network until they arrive at the destination 130. The destination 130 may contain one or more processing chips 135 and/or one or more memory chips 140.

Figure 1B:
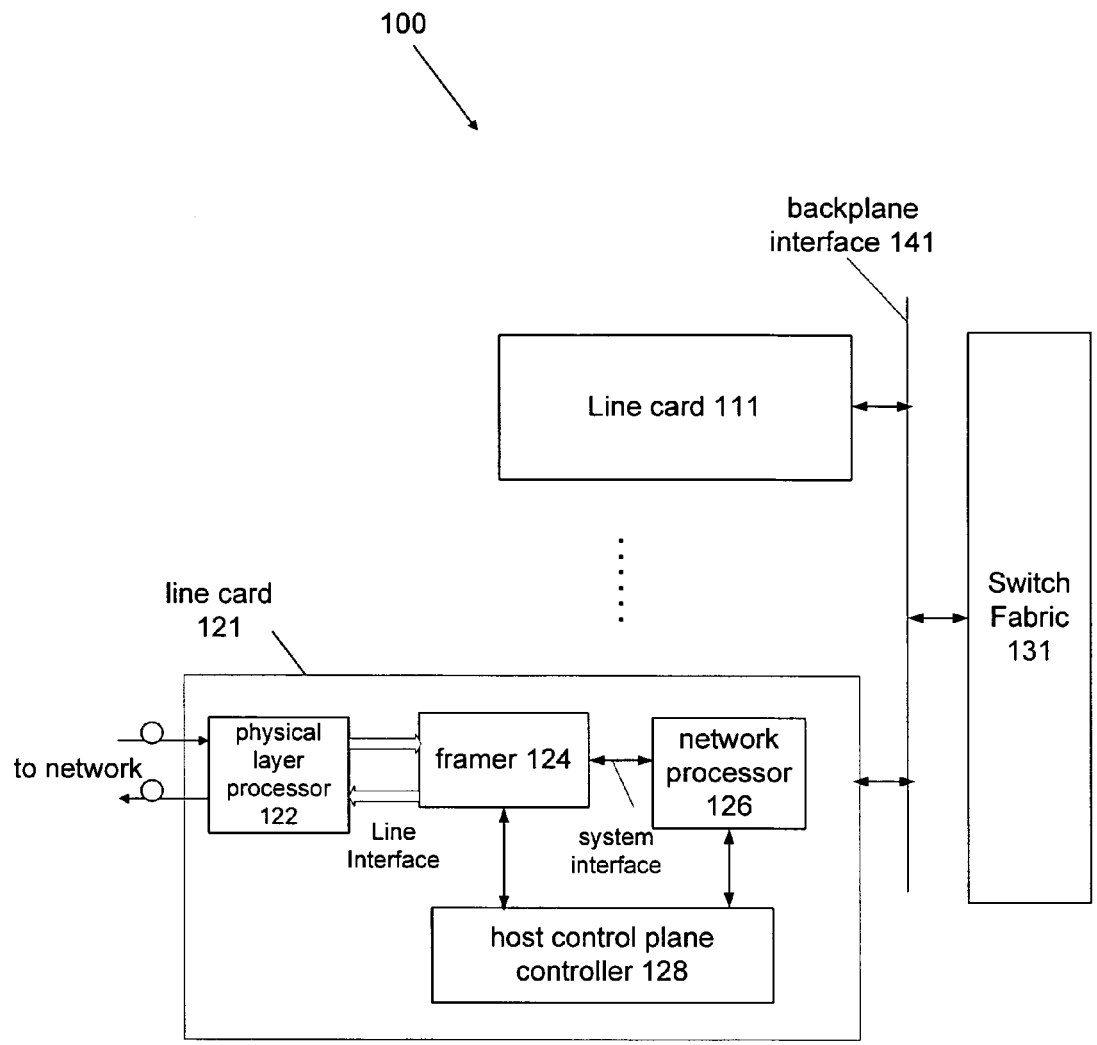
FIG. 1B shows a suitable system embodiment in accordance with an embodiment of the present invention.

FIG. 1B depicts a suitable system embodiment in accordance with an embodiment of the present invention. System 101 may include line card 111, line card 121, system fabric 131, and backplane interface 141. Line card 111 may be implemented as a SONET/SDH add-drop multiplexer, a Fibre Channel compatible line input, an Ethernet line input or a SONET/SDH line input.

Line card 121 may be implemented as a transceiver capable of transmitting and receiving frames and/or packets to and from a network that is compatible with SONET/SDH as well as other protocols such as OTN, TFI-5, and Ethernet, although other standards may be used. For example, SONET/SDH and OTN are described for example in: ITU-T Recommendation G.709 Interfaces for the optical transport network (OTN) (2001); ANSI T1.105, Synchronous Optical Network (SONET) Basic Description Including Multiplex Structures, Rates, and Formats; Bellcore Generic Requirements, GR-253-CORE, Synchronous Optical Network (SONET) Transport Systems: Common Generic Criteria (A Module of TSGR, FR-440), Issue 1, December 1994; ITU Recommendation G.872, Architecture of Optical Transport Networks, 1999; ITU Recommendation G.825, "Control of Jitter and Wander within Digital Networks Based on SDH" March, 1993; ITU Recommendation G.957, "Optical Interfaces for Equipment and Systems Relating to SDH", July, 1995; ITU Recommendation G.958, Digital Line Systems based on SDH for use on Optical Fibre Cables, November, 1994; and/or ITU-T Recommendation G.707, Network Node Interface for the Synchronous Digital Hierarchy (SDH) (1996). For example, an implementation of TFI-5 is described in TFI-5: TDM Fabric to Framer Interface Implementation Agreement (2003) available from the Optical Internetworking Forum (OIF). For example, IEEE 802.3 describes Ethernet standards.

For example, the network may be any network such as the Internet, an intranet, a local area network (LAN), storage area network (SAN), a wide area network (WAN). One implementation of line card 121 may include physical layer processor 122, framer 124, network processor 126, and host-control plane controller 128.

Physical layer processor 122 may receive optical or electrical signals from the network and prepare the signals for processing by downstream elements such as framer 124. For example, for frames and/or packets received from the network, physical layer processor 122 may convert an optical signal to electrical format and/or remove jitter from signals from the network. For frames and/or packets to be transmitted to the network, physical layer processor 122 may remove jitter from signals provided by upstream devices such as framer 124 and prepare signals for transmission to the network, which may be optical or electrical format. Framer 124 may utilize embodiments of the present invention to construct frames and/or packets for transmission to a network in formats such as Ethernet, SONET/SDH, and/or OTN (although other formats may be used).

For frames and/or packets received from a network, framer 124 may utilize embodiments of the present invention to process such frames and/or packets. Framer 124 may transfer overhead from frames and/or packets to a higher layer level processor such as a network processor 126. For example, framer 124 and network processor 126 may intercommunicate using an interface compatible for example with SPI-4 (described for example in the Optical Internetworking Forum (OIF Document) OIF-SPI4-02.1 and ITU-T G.707 2000, T1.105-2001 (draft), T1.105.02-1995, and ITU-T recommendations G.7042 and G.707), although interfaces compatible with other standards may be used.

Network processor 126 may perform layer 2 or layer 3 (as well as other higher layer level) processing on frames and/or packets provided by and to framer 124 in conformance with applicable link, network, transport and application protocols. Network processor 126 also may perform traffic management at the IP layer.

Host-control plane controller 128 may configure operation of framer 124 and network processor 126. For example, host-control plane controller 128 may program/provision framer 124 to control the content of frames. Host-control plane controller 128 could be implemented as separate from network processor 126 and communicate with the framer 124 and network processor 126 using an interface that complies with Peripheral Component Interconnect (PCI) Local Bus Specification, Revision 2.2, Dec. 18, 1998 available from the PCI Special Interest Group, Portland, Oreg., U.S.A. (as well as revisions thereof) or PCI-X Specification Rev. 1.0a, Jul. 24, 2000, available from the aforesaid PCI Special Interest Group, Portland, Oreg., U.S.A., although other standards may be used. Host-control plane controller 128 could be implemented as part of network processor 126, although other implementations may be used.

In one implementation, components of line card 121 may be implemented among the same integrated circuit. In another implementation, components of line card 121 may be implemented among several integrated circuits that intercommunicate using, for example, a bus or conductive leads of a printed circuit board.

Backplane interfaces 131 may be implemented as a single or multi-pin interface and may be used by line cards to interface with system fabric 141. For example, backplane interfaces 131 may be compatible with TFI-5 or CSIX (described in CSIX-L1: Common Switch Interface Specification-L1 (2000)), although other standards may be used. System fabric 141 may transfer IP packets or Ethernet packets (as well as other information) between line cards based on relevant address and header information. System fabric 141 can be implemented as a packet switch fabric or a TDM cross connect. System fabric 141 can be any device (or devices) that interconnect numerous dataplanes of subsystems (i.e. linecards) together.

In virtual concatenation, each SPE within a concatenated group representing the data frame for transmission contains an identifier, called a Multi-Frame Identifier, or MFI. The MFI forms part of the SONET/SDH path overhead information in the SPE and indicates the SPE's sequence and position within the group. As may be appreciated, the ability to identify the individual payloads by the MFI provides the ability for the system to split the payloads into various sizes or configurations, as long as the MFI is provided with each payload.

Virtual concatenation does not require intermediate node support, so the source 110 and the destination 130 for the network are the only specialized hardware required. The destination 130 reassembles the SPEs in the correct order to recover the data. To compensate for different arrival times of the received data, a phenomenon known as differential delay, the receiving circuits has typically contained some buffer memory so that the data can be properly realigned.

The transmission rates and capacities of virtually concatenated payloads may vary, and may include, for example, SDH designations VC-3 and VC-4, which have payload capacities of 48.960 Mbit/s and 149.760 Mbit/s, respectively. Again, the VC-3 and VC-4 designations represent the virtual containers where, for example, VC-4 includes 9 rows of 261 columns transmitted in a 125 microsecond interval, and VC-3 is 9 rows of 85 columns transmitted in the 125 microsecond interval.

The SONET/SDH virtual concatenation standard provides a maximum differential delay equal to 2048 frames or 256 ms. Differential delay beyond this value cannot be processed. Actual compensable differential delay depends on the memory size used to store the data, called the Alignment Buffer. Alignment Buffer specifications are provided in ITU-T G.783, and state that the LOA (Loss of Alignment) defect "shall be detected if the alignment process cannot perform the alignment of the individual VC-4s to a common multiframe start (e.g. dLOA [LOA defect] is activated if the differential delay exceeds the size of the alignment buffer.)

The present design determines whether an LOA defect has occurred. The write address of each virtual concatenation member includes the MFI value for a current data byte and the position in the frame for the current data byte. 765 payload bytes exist in each STS-1 frame and 2349 payload bytes are provided in each STS-3c frame. The system may add "stuff" bytes, or "don't care" bytes, to all STS-1 payloads and divide all STS-3 payloads into 3 parts so that a common format can be used in both situations.

The dLOA, or LOA defect, occurs when members from the same virtual concatenation group cannot be aligned. An example for a dLOA to occur is when the differential delay exceeds the size of the alignment buffer. Generally, loss of alignment may occur under certain conditions, and the present design identifies and sets a dLOA indication when at least one of those conditions occurs.

Loss of alignment, LOA, or inability to align, may occur if the difference between the write and read addresses of the alignment buffer for any member is exceeds the buffer size. For example, a buffer size of 768 and a read address of 802 and a write address of 16 indicates loss of alignment or inability to align. LOA then is set if the system does not have member addition with LCAS support. Under normal operation, the system provides the read address of alignment buffers for all members belonging to the same virtual concatenation group to be equal to the minimum write address in the virtual concatenation group minus a threshold value. The threshold value accounts for write/read delay. In other words, $$RA = MinWA - thresh \tag{1}$$

RA is the Read-Address for all members in the virtual concatenation group, MinWA is minimum write address, and thresh is the threshold value. For each virtual concatenation group, the system reads data bytes from different members having the same address (i.e., at the same position in the frame and multi-frame structure) at the same time. The system reads data bytes at a particular position if all members have received data bytes at the particular position (i.e., the corresponding address for all members have been written). Therefore, the read address lags behind the minimum write address, or the write address of the member having a lowest value. To maximize the compensation range for a given Alignment Buffer size, the system may provide a read indication closely after the minimum write address.

Figure 2:
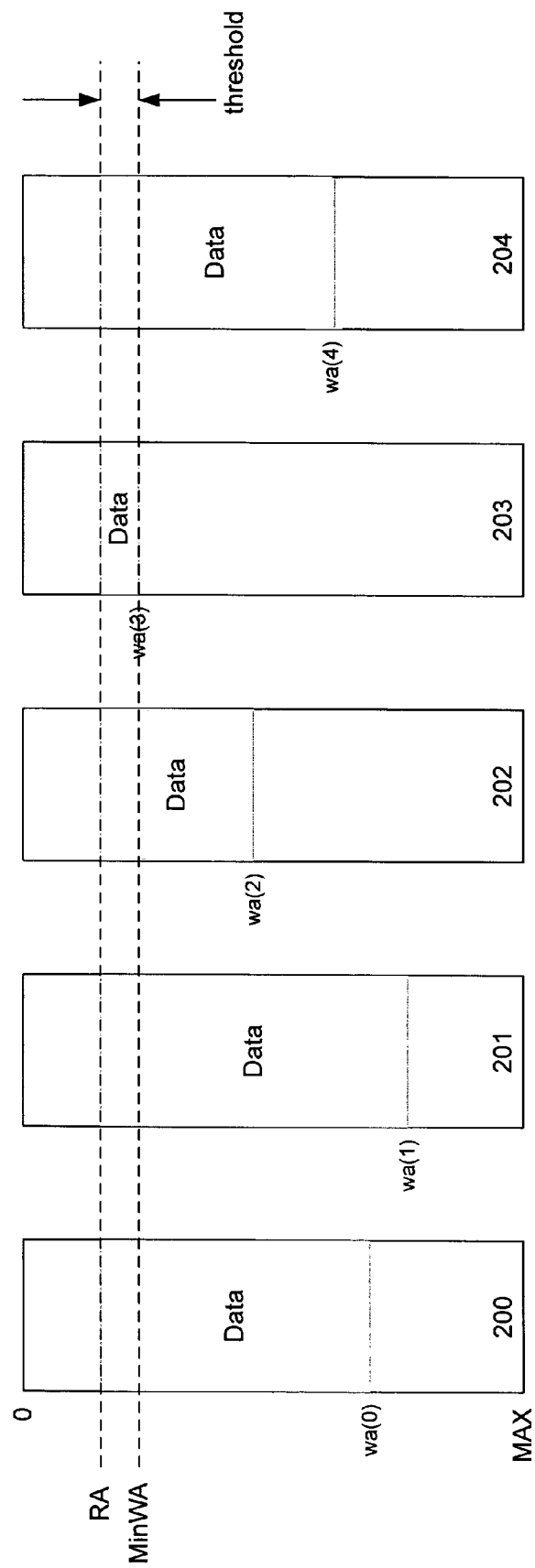
FIG. 2 illustrates performing a determination according to a first condition.

Operation of the system is illustrated in FIG. 2. From FIG. 2, five data buffers 200-204 are illustrated. Address 0 is at the top of each buffer, with address MAX at the bottom. Read addresses are uniformly located across the five data buffers 200-204, with minimum write addresses also located across the five data buffers 200-204, separated by a threshold value. Data is written to the end of the existing data, and thus wa(0), wa(1), through wa(4) represent the five write addresses for the presented data configurations. FIG. 2 represents a first condition, with loss of alignment declared for a member i if:

$$wa(i) - RA > SIZE \tag{2}$$

where wa(i) denotes the write address of member i, RA denotes the read address for all members of the this group, and SIZE denotes the size of the Alignment Buffer for the members. Equation (2) represents Condition (1), evaluated by the destination 130 to determine whether a loss of alignment defect exists.

Figure 3:
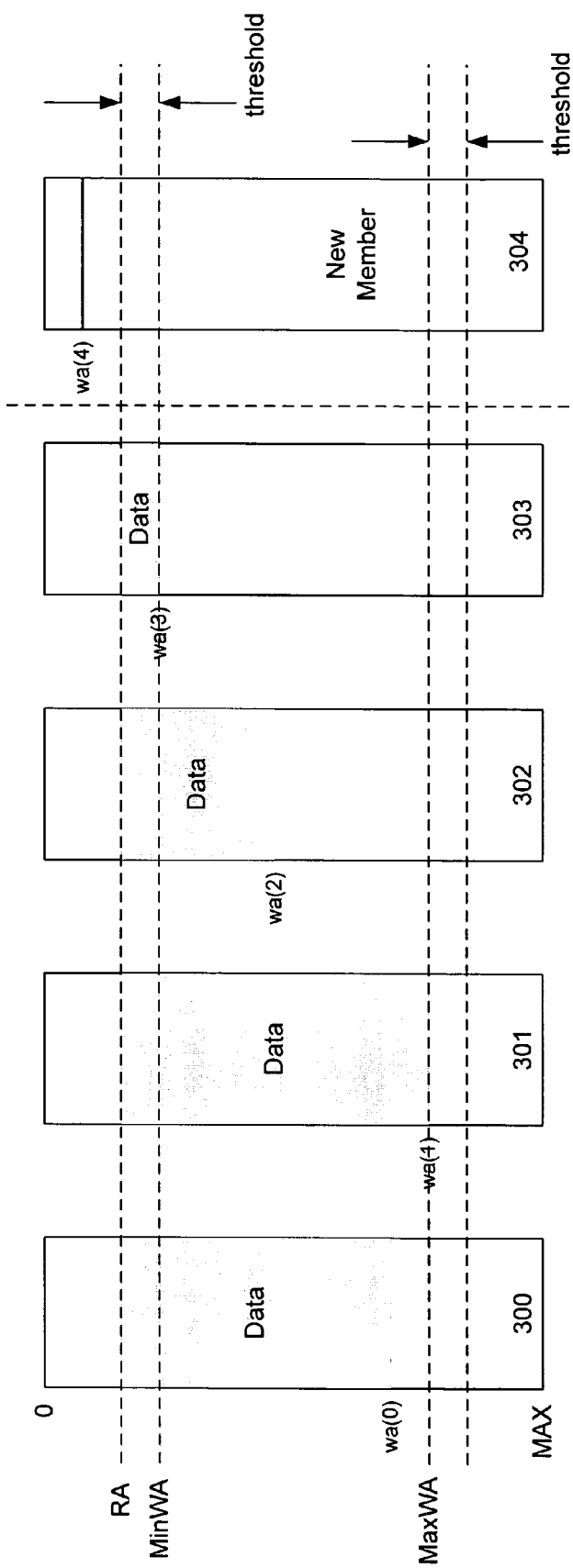
FIG. 3 shows a new member being added having a write address less than the current read address RA.

LCAS support allows addition or removal of members, and thus more conditions may be encountered triggering the dLOA indication. FIG. 3 illustrates the situation where the system adds a new member and the write address is less than the current group read address RA. FIG. 3 shows four memory buffers or alignment buffers 300-304 and a new member 304, again with read address (RA) values, minimum write address (WA) values, and maximum WA values. Write Address wa(4) for new member 304 is closer to zero than the minimum RA. In this situation, the system would halt reading from the buffers upon adding new member 304 to wait for the write address of the new member 304 to reach the uniform read address, or in other words the system would wait for the write address to "catch up" to the read address. After a period of time, the FIFO status would appear as shown in FIG. 4, and the system read process could once again proceed.

Figure 4:
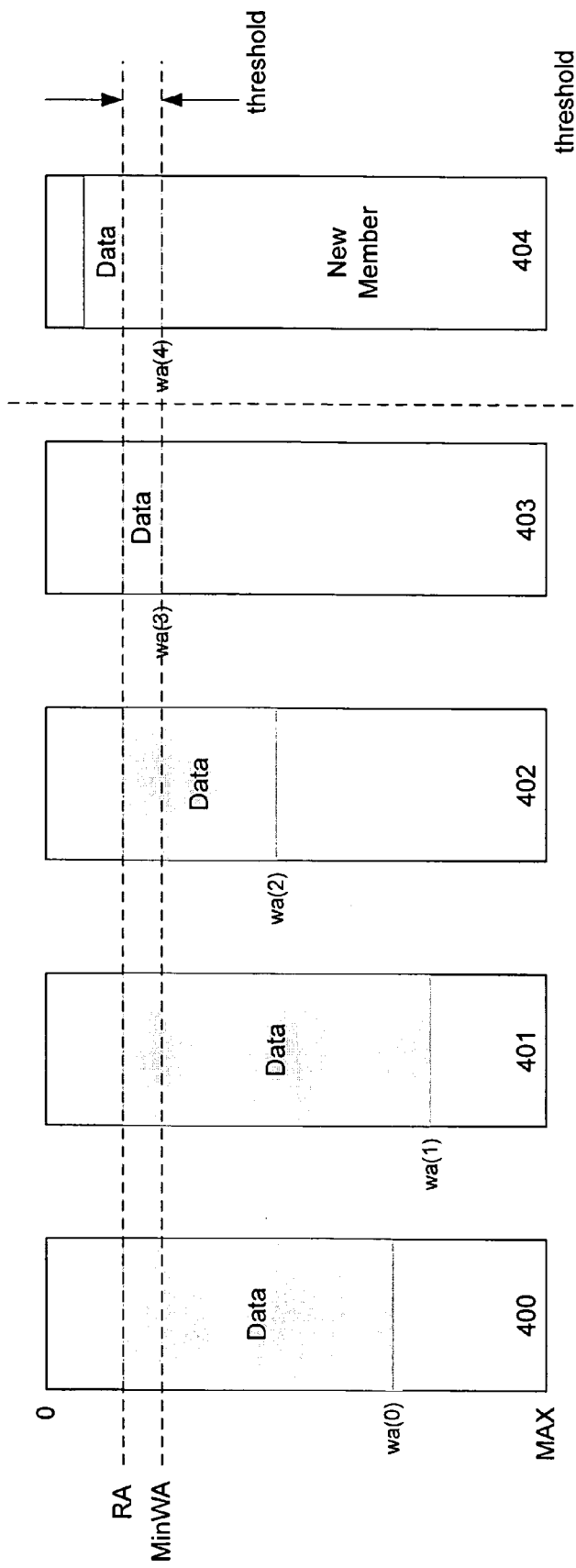
FIG. 4 shows the write address for the new member "catching up" with the minimum write address for all members.

FIG. 4 differs from FIG. 3 by illustrating additional data in the buffers coupled with the new member 404 having data that exceeds the RA and is equivalent to the minimum WA. After the read address "catches up" with the minimum WA, the maximum distance between the write address and group read address is equal to the maximum distance between the write address and the maximum write address (for this group, denoted as MaxWA) plus the threshold (before or after the read address catches up). Therefore, a second condition for LOA condition is the LOA condition being declared for a member or new member i if:

$$MaxWA + thresh - wa(i) > SIZE \tag{3}$$

Equation (3) represents Condition (2). The destination 130 uses both Condition (1) and Condition (2) to determine whether a member of a group is in LOA state, or has lost alignment.

When LCAS support is supplied, the system may determine whether a potential LOA defect may occur once a new member is added to a group. Issues may arise when the system adds a member and immediately declares an LOA state. The present design detects a potential LOA condition before a member is added to a group or accepted to the group. Such a condition can be employed to stop adding the member.

The destination 130 receives an ADD request when it complies with the LCAS protocol. Before the destination 130 adds a member to a group, the destination 130 computes the maximum write address (MaxWA) and the minimum write address (MinWA) for the corresponding group without including this member. The destination 130 can apply Condition (1) and Condition (2) to determine whether to declare a LOA for this member, before added to the group, with the following modification. If the difference between the write address of the new member and the group read address is equal to the buffer size, or the difference between the write address of the new member and the maximum group write address plus the threshold, LOA may occur subsequently due to pointer movement changing the write address of the member relative to other members. The system may reduce the buffer size by a small value a when detecting the LOA condition for member in an ADD condition.

Thus an alternate to Condition (1), called here Condition (1') and represented by Equation (4), is that the system declares an LOA condition for a member in ADD condition for a member i if:

$$wa(i)-RA>SIZE-\alpha \quad (4)$$

where wa(i) denotes the write address of the new member i and RA denotes the read address for all members of the this group excluding this new member.

Condition (2'), represented by equation (5) is an alternate to Condition (2) that declares an LOA condition for a member i (in ADD mode) if:

$$(MaxWA+thresh)-wa(i)>SIZE-\alpha \quad (5)$$

where MaxWA denotes the maximum write address for all members of this group excluding the new member. As the destination 130 does not use this new member to calculate MinWA or MaxWA, a third condition can be employed for LOA detection of a member in ADD mode.

Figure 5:
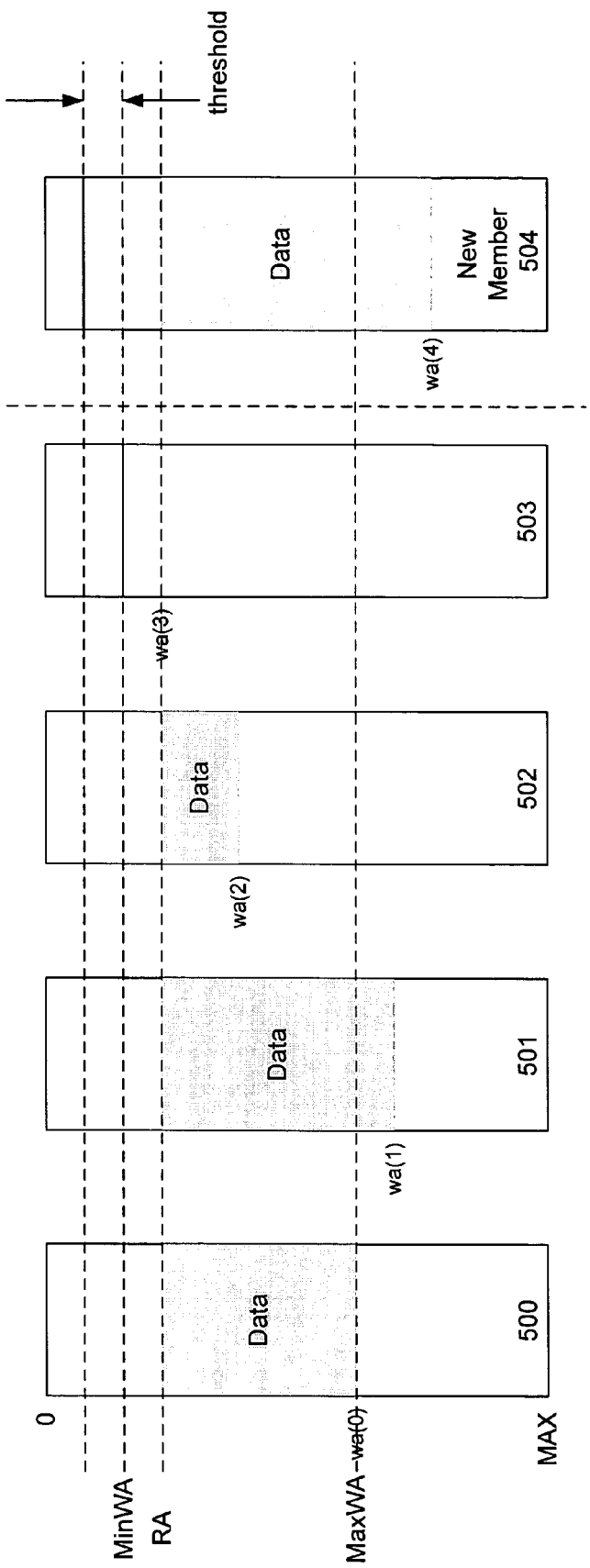
FIG. 5 illustrates addition of a new member having a write address less than the current group read address, and before the write address "catches up," addition of another new member having a write address greater than the maximum write address.

FIG. 5 illustrates a case where member 3 503 is added, with a write address less than the current group read address (RA). Before the wa(3) moves to the RA point, another new member may be added with a write address greater than MaxWA, namely new member 504. In this case, Condition (1') and (2') above would be inapplicable, as the RA is not updated when the new member 504 is omitted from the computation of MaxWA. Thus the system uses MinWA for a third condition, Condition (3'), represented by Equation (6). Condition (3') declares an LOA condition for a member I in ADD mode if:

$$wa(i)-(Min(WA)-thresh)>SIZE-\alpha \quad (6)$$

where MinWA denotes the minimum write address for all members of this group excluding the new member.

The destination 130 uses conditions (1'), (2') and (3') to determine whether a member is in LOA state before the member is added to a group in ADD mode. Condition (3') can be employed at the destination 130 to decide whether to accept the member.

Hence two sets of conditions may be applied to determine whether to provide a Loss of Alignment defect indication. The first set of conditions apply in cases where members belong to a group without LCAS support, or without the ability to add or remove members, or members accepted by an LCAS group, and include determining, for a member i, whether the write address for member i minus the (global) read address, or the difference between the read address and the write address for member i, is greater than the size of the alignment buffer for all members (Condition (1)). The second condition determines whether, for member i, the maximum write address plus a threshold value minus the write address for member i is greater than the size of the alignment buffer for all members (Condition (2)). If either condition is true, the result is the destination 130 declaring a loss of alignment.

The second set of conditions applies when new members are added to a group where LCAS is available, or providing the ability to add or remove members. In this situation, the system determines whether an LOA defect would occur if a member is added according to three conditions, all pertaining to an ADD condition contemplating addition of a new member. Condition (1') determines whether, for a member, the write address of the member minus the read address for the member is greater than the size of the alignment buffer for all members minus a small value. Condition (2') determines whether, for member i, the maximum write address for all members plus a threshold value minus the write address is greater than the size of the alignment buffer for all members minus a small value. The third condition, Condition (3'), determines for a member to be added whether the write address minus the minimum write address for the group, exclusive of the member to be added, minus a threshold value is greater than the size of the alignment buffer for all members minus a small value. If any of these three conditions is true, then the destination 130 declares a loss of alignment before the member is added to a group. This condition is used by the network operator to prevent the addition of such a member, thereby avoiding the trouble of LOA after member addition.

It will be appreciated to those of skill in the art that the present design may be applied to other systems that perform data processing, and is not restricted to the communications structures and processes described herein. Further, while specific hardware elements and related structures have been discussed herein, it is to be understood that more or less of each may be employed while still within the scope of the present invention. Accordingly, any and all modifications, variations, or equivalent arrangements which may occur to those skilled in the art, should be considered to be within the scope of the present invention as defined in the appended claims.

What is claimed is:

1. A method for providing a loss of alignment defect indication in a destination device capable of processing virtually concatenated payload members, the method comprising:

for a received virtually concatenated payload member:

determining whether a difference between a write address for the received virtually concatenated payload member and a read address for all virtually concatenated payload members is greater than a size of an alignment buffer storing the virtually concatenated payload members; and assessing whether a difference between a maximum write address for all virtually concatenated payload members plus a threshold value and the write address for the virtually concatenated payload member is greater than the size of the alignment buffer storing the virtually concatenated payload members; and performing additional evaluations when the destination device provides an ability to add at least one additional member beyond the received virtually concatenated payload member, one additional evaluation including:

performing a first evaluation of whether a difference between the write address for the received virtually concatenated payload member and the read address for all virtually concatenated payload members is greater than a size of the alignment buffer storing the virtually concatenated payload members minus a small value.

2. The method of claim 1, wherein one additional evaluation comprises:
assessing whether a difference between the maximum write address for all virtually concatenated payload members plus the threshold value and the write address for the virtually concatenated payload member is greater than the size of the alignment buffer storing the virtually concatenated payload members minus a small value.

3. The method of claim 1, wherein one additional evaluation comprises:
considering whether a difference between the write address for the virtually concatenated payload member and the minimum write address for all virtually concatenated payload members minus the threshold value is greater than the size of the alignment buffer storing the virtually concatenated payload members minus a small value.

4. The method of claim 1, further comprising:
assessing whether a difference between the maximum write address for all virtually concatenated payload members plus the threshold value and the write address for the virtually concatenated payload member is greater than the size of the alignment buffer storing the virtually concatenated payload members minus the small value.

5. The method of claim 4, further comprising:
considering whether a difference between the write address for the virtually concatenated payload member and the minimum write address for all virtually concatenated members minus the threshold value is greater than the size of the alignment buffer storing the virtually concatenated payload members minus the small value.

6. The method of claim 5, wherein a positive result from any of the performing, considering, and assessing constitutes the loss of alignment defect indication.

7. A method for providing a loss of alignment defect indication in a device capable of processing virtually concatenated payload groups, the method comprising:
for a received member:
determining whether a difference between a write address for the received member and a read address for all payload members is greater than a size of an alignment buffer; and
assessing whether a difference between a maximum write address for all members plus a threshold value and the write address for the member is greater than the size of the alignment buffer, wherein a valid response to at least one of the determining and assessing results in the loss of alignment defect indication, and
performing additional evaluations when at least one additional member can be added beyond the received member, wherein one additional evaluation comprises:
considering whether a difference between a write address for the additional member and the minimum write address for all members minus the threshold value is greater than the size of the alignment buffer storing the members minus a small value.

8. The method of claim 7, wherein one additional evaluation comprises:
performing a first evaluation of whether a difference between the write address for the received member and a read address for all members is greater than a size of the alignment buffer storing the members minus the small value.

9. The method of claim 7, wherein one additional evaluation comprises:
assessing whether a difference between the maximum write address for all members plus the threshold value and the write address for the member is greater than the size of the alignment buffer storing the members minus the small value.

10. The method of claim 8, further comprising:
assessing whether a difference between the maximum write address for all members plus the threshold value and the write address for the member is greater than the size of the alignment buffer storing the members minus the small value.

11. The method of claim 10, further comprising:
considering whether a difference between the write address for the member and the minimum write address for all members minus the threshold value is greater than the size of the alignment buffer storing the members minus the small value.

12. The method of claim 11, wherein a positive result from any of the performing, considering, and assessing constitutes the loss of alignment defect.

13. A processor for processing a loss of alignment defect, comprising:
for a received member:
means for determining, for the received member, whether a difference between a write address for the received member and a read address for all payload members is greater than the size an alignment buffer; and
means for assessing whether a difference between a maximum write address for all members plus a threshold value and a write address for the member is greater than the size of the alignment buffer, wherein a valid response to at least one of the determining means and assessing means results in the loss of alignment defect indication, and
means for performing additional evaluations when at least one additional member can be added beyond the received member, wherein the means for performing one additional evaluation comprises:
means for considering whether a difference between the write address for the member and the minimum write address for all members minus the threshold value is greater than the size of the alignment buffer storing the members minus a small value.

14. A system comprising:
a physical layer interface;
a framer comprising:
for a received member:
means for determining, for the received member, whether a difference between a write address for the received member and a read address for all payload members is greater than a size of an alignment buffer; and
means for assessing whether a difference between a maximum write address for all members plus a threshold value and the write address for the member is greater than the size of the alignment buffer; and
means for performing additional evaluations when at least one additional member can be added beyond the received member, wherein the means for performing additional evaluation includes:

means for considering whether a difference between a write address for the additional member and a minimum write address for all members minus the threshold value is greater than the size of the alignment buffer storing the members minus a small value;

a network processor; and a second interface to at least provide intercommunication between the framer and the network processor.

15. The system of claim 14, wherein the physical layer interface is compatible with PCI.

16. The system of claim 14, wherein the physical layer interface is compatible with PCI-x.

17. The system of claim 14, further comprising a host-control plane controller coupled to the physical layer interface.

18. The system of claim 14, wherein the second interface is compatible with PCI.

19. The system of claim 14, wherein the second interface is compatible with PCI-x.

20. The system of claim 14, further comprising a second interface and a system fabric.

21. The system of claim 20, wherein the second interface is compatible with TFI-5.

22. The system of claim 20, wherein the second interface is compatible with CSIX.

23. The system of claim 20, further comprising a line card to intercommunicate with the system fabric.

24. The system of claim 23, wherein the line card is to provide an interface for a Fiber Channel compatible network.

25. The system of claim 23, wherein the line card is to provide an interface for an Ethernet compatible network.

26. The system of claim 23, wherein the line card is to perform add-drop multiplexing.

* * * * *